J. ST. V. PLETTS.
APPARATUS FOR WIRELESS TELEGRAPHY.
APPLICATION FILED NOV. 9, 1917.
1,291,121.
Patented Jan. 14, 1919.
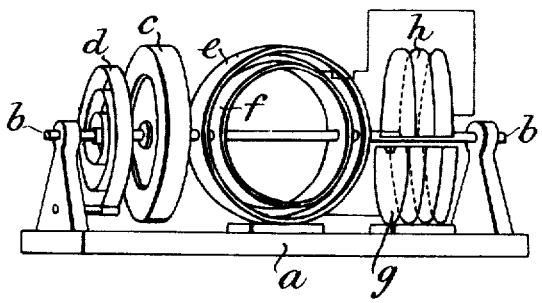
Inventor:
John St. Vincent Pletts
By his attorneys:
Sheffield Betts

UNITED STATES PATENT OFFICE.

JOHN ST. VINCENT PLETTS, OF LONDON, ENGLAND, ASSIGNOR TO MARCONI WIRELESS TELEGRAPH COMPANY OF AMERICA, OF NEW YORK, N. Y., A CORPORATION OF NEW JERSEY.

APPARATUS FOR WIRELESS TELEGRAPHY.

1,291,121.  Specification of Letters Patent.  Patented Jan. 14, 1919.

Application filed November 9, 1917. Serial No. 201,085.

*To all whom it may concern:*

Be it known that I, JOHN ST. VINCENT PLETTS, a subject of the King of Great Britain, residing at Marconi House, Strand, London, England, have invented new and useful Improvements in Apparatus for Wireless Telegraphy, of which the following is a specification.

This invention relates to improvements in apparatus for wireless telegraphy whereby it is possible to attract the attention of a listening operator and to enable him rapidly to tune his receiver to the transmitter.

In modern wireless telegraphy, particularly when continuous waves are employed, it is possible, and often desirable, to use very accurately tuned and highly selective apparatus, and with such apparatus it is easy to miss communications owing to slight differences in the tuning of the receiver and transmitter.

Such differences are particularly liable to occur when a station is communicating with several others as it is almost impossible for them all to have exactly the same wave length, or when a station is mobile as it is then almost impossible to keep the wave length exactly constant.

According to this invention I form one or both of the components which determine the time period of the timing oscillatory circuit, and which are as is well known the inductance and the capacity thereof with a part capable of mechanical oscillation for instance with a part mounted on an axle capable of partial rotation and fitted with a spring like the balance wheel of a watch.

My invention is illustrated by the accompanying drawing, in which *a* is a frame carrying a shaft *b* upon which is mounted a fly-wheel *c*, and *d* is a spring fixed at one end to the frame *a* and at the other end to the shaft *b*, so that the latter when set in motion by hand will oscillate for a short time about its position of rest. *e* and *f* are two inductance coils connected in series, *e* being fixed to the frame *a* and *f* to the shaft *b*, so that the total inductance varies as the latter oscillates. *g* and *h* are two sets of semi-circular disks, *g* being fixed to the frame *a* and *h* to the shaft *b*, so that as the latter oscillates one set moves in and out between the other set and varies the capacity.

With this device in the transmitter circuit waves may be sent out which at first vary over a considerable range and then over a smaller and smaller range until the wave length becomes constant as the oscillating part comes to rest. Such waves, producing a distinctive sound every time they come into tune with a receiver, attract the attention of the operator even though his receiver is not accurately tuned to the normal wave length of the transmitter and enables him to tune it thereto with rapidity and accuracy.

Similarly, with this device in the receiver, the operator may test over a considerable range for an unvarying wave and if any such exists the constantly decreasing range enables him to tune his receiver rapidly and accurately thereto.

What I claim is:—

1. The combination with an axle, of bearing means therefor, a time period determining component for an electrical circuit, said component having a plurality of parts one of which is fast on said axle, and means for producing an oscillatory movement of said axle of constantly decreasing range when the axle has been given an initial turn.

2. The combination of a frame, an axle rotatably mounted therein, a spring having one end fixed to the frame and the other to the axle, and an oscillatory electrical circuit having part of one of its time period determining components fast on the axle.

3. The combination of a frame, an axle rotatably mounted therein, a spring having one end fixed to the frame and the other to the axle, a fly wheel fast on the axle, and an oscillatory electrical circuit having part of one of its time period determining components fast on the axle.

4. The combination of a frame, an axle rotatably mounted therein, a spring having one end fixed to the frame and the other to the axle, an inductance and a capacity connected together in series and having a portion of each fast on the axle.

JOHN ST. VINCENT PLETTS.